(12) United States Patent
Mihara

(10) Patent No.: US 6,838,928 B2
(45) Date of Patent: Jan. 4, 2005

(54) BOOSTING CIRCUIT CONFIGURED WITH PLURALITY OF BOOSTING CIRCUIT UNITS IN SERIES

(75) Inventor: Masaaki Mihara, Hyogo (JP)

(73) Assignee: Renesas Technology Corp., Tokyo (JP)

(*) Notice: Subject to any disclaimer, the term of this patent is extended or adjusted under 35 U.S.C. 154(b) by 0 days.

(21) Appl. No.: 10/339,327

(22) Filed: Jan. 10, 2003

(65) Prior Publication Data

US 2004/0021504 A1 Feb. 5, 2004

(30) Foreign Application Priority Data

Jul. 31, 2002 (JP) ........................................ 2002-223187

(51) Int. Cl.[7] .............................. G05F 1/10; G05F 3/02
(52) U.S. Cl. ...................................................... 327/536
(58) Field of Search ................................ 327/536, 589; 363/59–60; 257/99

(56) References Cited

U.S. PATENT DOCUMENTS

| 5,180,928 | A | * | 1/1993 | Choi ........................... 327/541 |
| 5,191,232 | A | * | 3/1993 | Wang .......................... 327/306 |
| 6,075,403 | A | * | 6/2000 | Ishikawa et al. ............. 327/536 |
| 6,469,569 | B1 | * | 10/2002 | Miyamitsu .................. 327/536 |

FOREIGN PATENT DOCUMENTS

| JP | 63-316510 | 12/1988 | |
| JP | 07-46825 | 2/1995 | |
| JP | 08306870 A | * 11/1996 | ........... H01L/27/04 |

* cited by examiner

Primary Examiner—Quan Tra
(74) Attorney, Agent, or Firm—McDermott Will & Emery LLP

(57) ABSTRACT

By supplying a clock signal from an OSC to four stages of boosting circuit units connected in series, the boosting circuit units are rendered active. A delay element is inserted in the line of the clock signal to prevent all the boosting circuit units from being rendered active at the same time by one clock signal. Since the boosting circuit unit is rendered active one by one by the provision of the delay element, current congregation from the power supply potential at the circuit element connected closest to the input terminal of the boosting circuit unit of the first stage can be prevented. Thus, a boosting circuit of a high boosting efficiency is achieved.

5 Claims, 12 Drawing Sheets

BOOSTING CIRCUIT CONFIGURED WITH PLURALITY OF BOOSTING CIRCUIT UNITS IN SERIES

BACKGROUND OF THE INVENTION

1. Field of the Invention

The present invention relates to boosting circuits, particularly to a boosting circuit formed of a plurality of boosting circuit units.

2. Description of the Background Art

Many conventional boosting circuits are configured so that the capacitive element included in each of a plurality of boosting circuit units is connected in parallel. However, a boosting circuit of such a configuration has the boosting efficiency degraded by various factors such as the fabrication condition, the back gate effect, and the like of the transistor generally included as a circuit element of a boosting circuit unit.

A boosting circuit that suppresses such reduction in boosting efficiency is disclosed in, for example, Japanese Patent Laying-Open No. 63-316510. The boosting circuit disclosed in this publication is configured by having a plurality of boosting circuit units (boosting circuit blocks) connected in series.

Each boosting circuit block is operated by a clock input. The clock input turns on/off a plurality of transistors included in each boosting circuit block, whereby the capacitive element (capacitor for boosting) included in each of the plurality of boosting circuit blocks is switched between a charging state and a series connection state. The turn on/off of a plurality of transistors included in each boosting circuit block in response to a clock input is called "activation of a boosting circuit block" hereinafter.

Since the capacitor for boosting included in each of a plurality of boosting circuit blocks is connected in series in the boosting circuit disclosed in Japanese Patent Laying-Open No. 63-316510, the influence of the transistor fabrication condition, back gate effect and the like are eliminated to suppress reduction in the boosting efficiency.

It is to be noted that the boosting circuit disclosed in Japanese Patent Laying-Open No. 63-316510 has the clock input in common to all the boosting circuit blocks, as shown in FIG. 1 in this publication. This means that all the boosting circuit blocks are rendered active at the same time.

When the capacitor for boosting included in each of the plurality of boosting circuit blocks attains a series connection state, charge is supplied to all the capacitors for boosting starting from the input of the boosting circuit block of the first stage. Therefore, the current from the input power supply will congregate at the circuit element connected closest to the input of the first boosting circuit block. Power supply noise will be generated by this current congregation from the input power source to a particular circuit element, resulting in the problem of degradation in the boosting efficiency of the boosting circuit.

Also, further current congregation from the input power source to a particular circuit element will cause electromigration, whereby the boosting efficiency of the boosting circuit will be further degraded.

SUMMARY OF THE INVENTION

An object of the present invention is to provide a boosting circuit of high boosting efficiency, absent of current congregation from an input power source to a particular circuit element.

According to an aspect of the present invention, a boosting circuit includes a plurality of boosting circuit units connected in series, and a clock signal supply circuit supplying a clock signal to switch between a setup state and a pump up state of the plurality of boosting circuit units. The clock signal supply circuit includes a delay circuit providing time difference in the time of a clock signal arriving at each of the plurality of boosting circuit units.

Preferably, the delay circuit includes an odd number of stages of inverter circuits connected so as to form a loop oscillator circuit, providing an oscillation output as a clock signal.

Preferably, the boosting circuit unit includes a capacitive element used for a boosting operation. The capacitance of the capacitive element becomes greater as a function of distance from the output of the boosting circuit.

By setting a time difference in the arrival at each of the plurality of boosting circuit units in the present invention, current congregation from the input power source to a particular circuit element can be prevented. Also, the plurality of boosting circuit units will be rendered active sequentially to ensure the boosting operation of each boosting circuit unit. Thus, a boosting circuit of high boosting efficiency can be achieved.

By using a delay value of a delay circuit to define the cycle of a clock signal supplied by a clock signal supply circuit based on a loop oscillator circuit, consistency can be achieved between the speed of activation of each boosting circuit unit and the oscillation cycle. Thus, a boosting circuit of higher boosting efficiency can be achieved.

Also, by increasing the capacitance of the capacitive element included in each of the plurality of boosting circuit units as a function of distance from the output of the boosting circuit, reduction in the boosting efficiency caused by parasitic capacitance can be prevented. A boosting circuit of further higher boosting efficiency can be achieved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
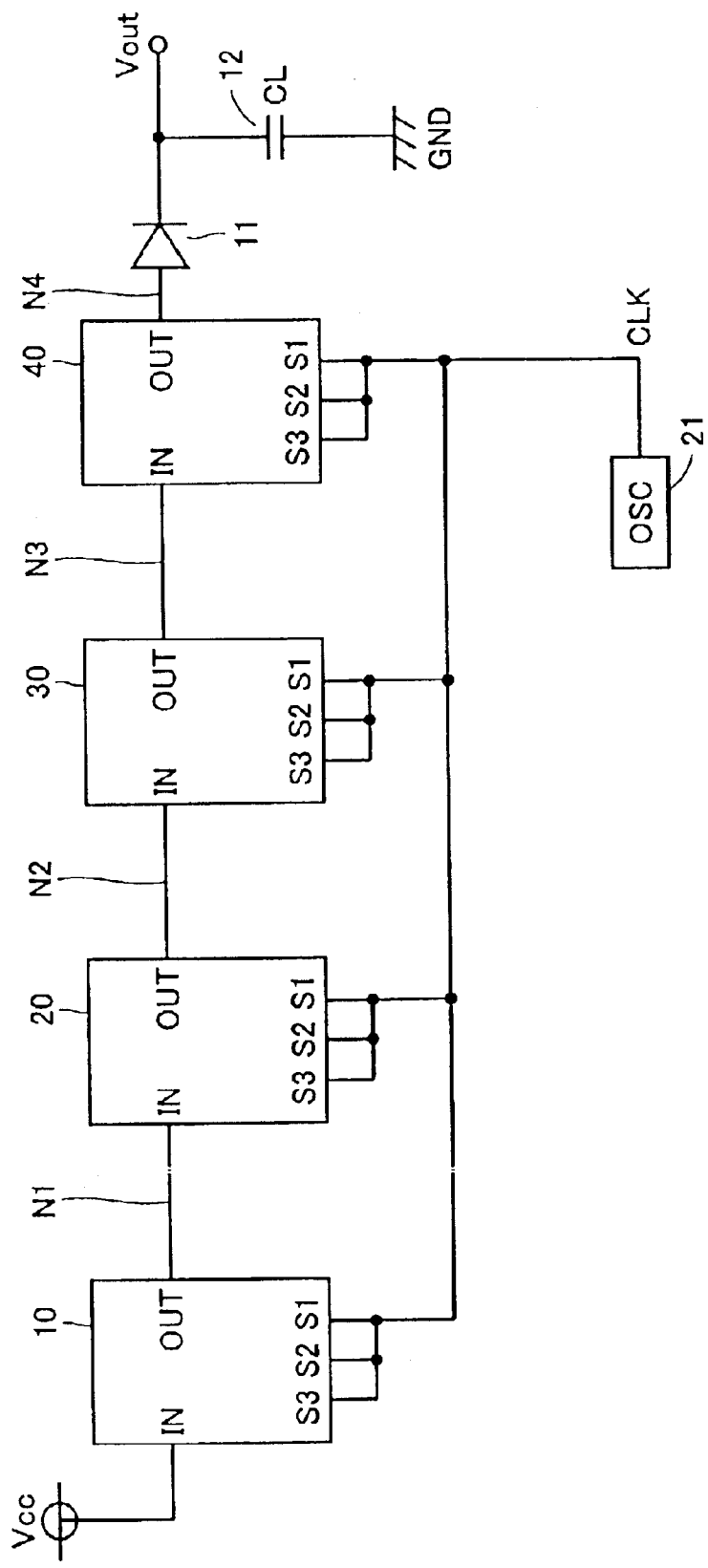
FIG. 1 is a schematic block diagram of a conventional boosting circuit as the background of describing the present invention.

Embodiments of the present invention will be described in detail with reference to the drawings. In the drawings, the same or corresponding components have the same reference characters allotted, and description thereof will not be repeated.

FIG. 1 is a schematic block diagram of a conventional boosting circuit as the background to describe the present invention.

The boosting circuit of FIG. 1 includes a first-stage boosting circuit unit 10, a second-stage boosting circuit unit 20, a third-stage boosting circuit unit 30, a fourth stage boosting circuit unit 40, a diode 11 transferring charge in only one direction, a capacitive element 12 storing the charge from boosting circuit units 10–40 through diode 11, and a clock signal generation circuit (referred to as OSC hereinafter) 21 supplying a clock signal CLK to boosting circuit units 10–40. Boosting circuit units 10–40 are connected in series. Clock signal CLK supplied from OSC 21 is a common version of clock signals S1–S3 of FIG. 4 that will be described afterwards.

Figure 2:
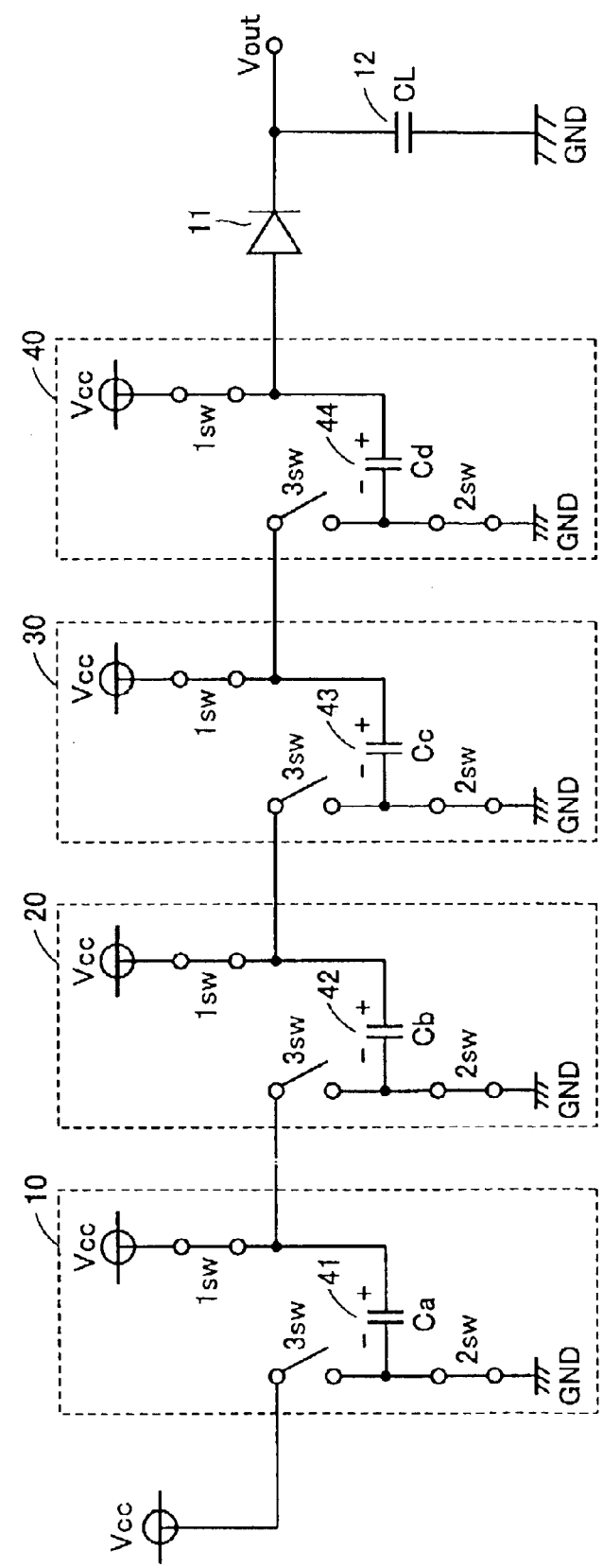
FIG. 2 is a schematic diagram of the boosting circuit of FIG. 1 representing a setup state.

FIG. 2 is a schematic diagram representing a setup state of the boosting circuit of FIG. 1. In the present specification, a setup state refers to a state where charge is stored into capacitive elements 41–44 included in respective boosting circuit units through a power supply potential Vcc of each stage by driving clock signal CLK to one level.

By driving clock signal CLK to one level, switches 1sw and 2sw in each boosting circuit unit are electrically connected whereas a switch 3sw is cut off, as shown in FIG. 2. Accordingly, the input and output between the boosting circuit units are electrically cut off, and each capacitive element is connected between power supply potential Vcc and ground potential GND. Charge will be supplied to capacitive elements 41–44 of respective boosting circuit units through power supply potential Vcc of each stage.

Figure 3:
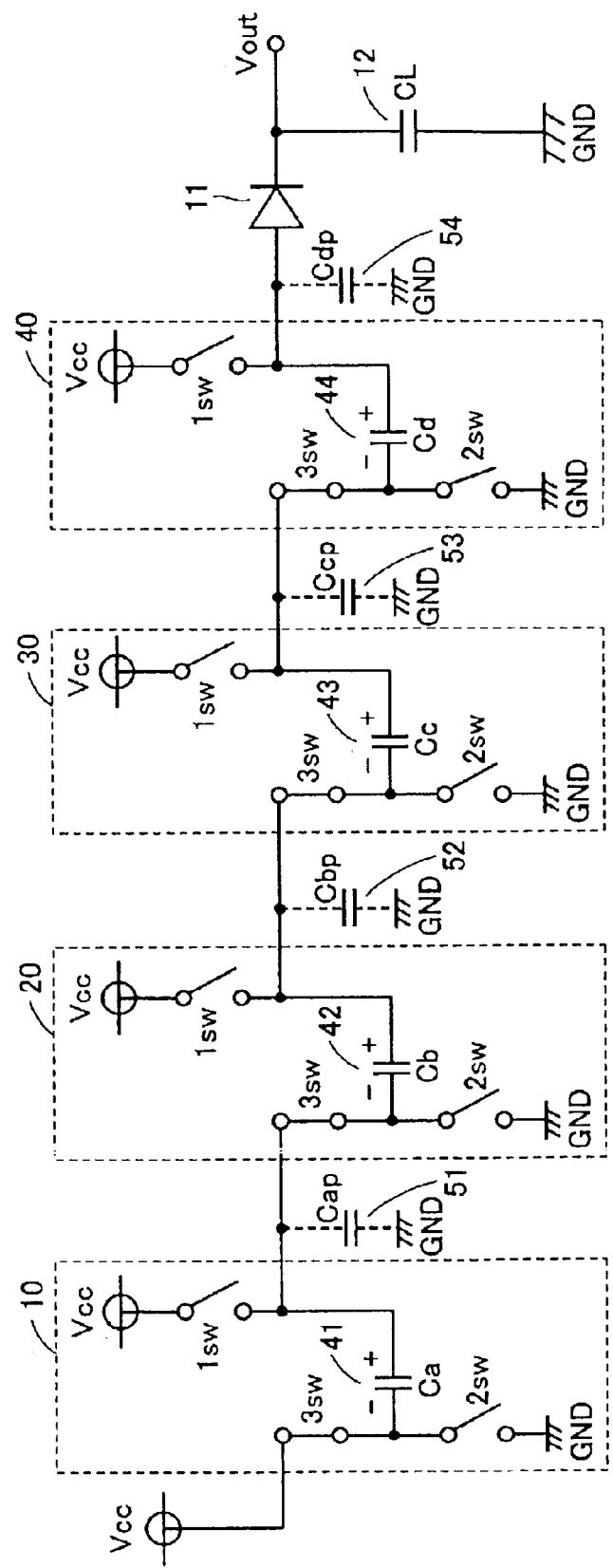
FIG. 3 is a schematic diagram of the boosting circuit of FIG. 1 representing a pump up state.

FIG. 3 is a schematic diagram representing a pump up state of the boosting circuit of FIG. 1. In the present specification, a pump up state refers to the state where capacitive elements 41–44 of respective boosting circuit units are connected in series to allow a boosting operation by driving clock signal CLK to the other level.

By driving clock signal CLK to the other level, switches 1sw and 2sw in each boosting circuit unit are electrically cut off whereas switch 3sw is electrically connected, as shown in FIG. 3. Accordingly, the input and output between the boosting circuit units are electrically connected, and each capacitive element is cut off from power supply potential Vcc and ground potential GND. Capacitive elements 41–44 of respective boosting circuit units are connected in series, and a boosting operation is conducted. Parasitic capacitances 51–54 of capacitive elements 41–44 will be described afterward.

Figure 4:
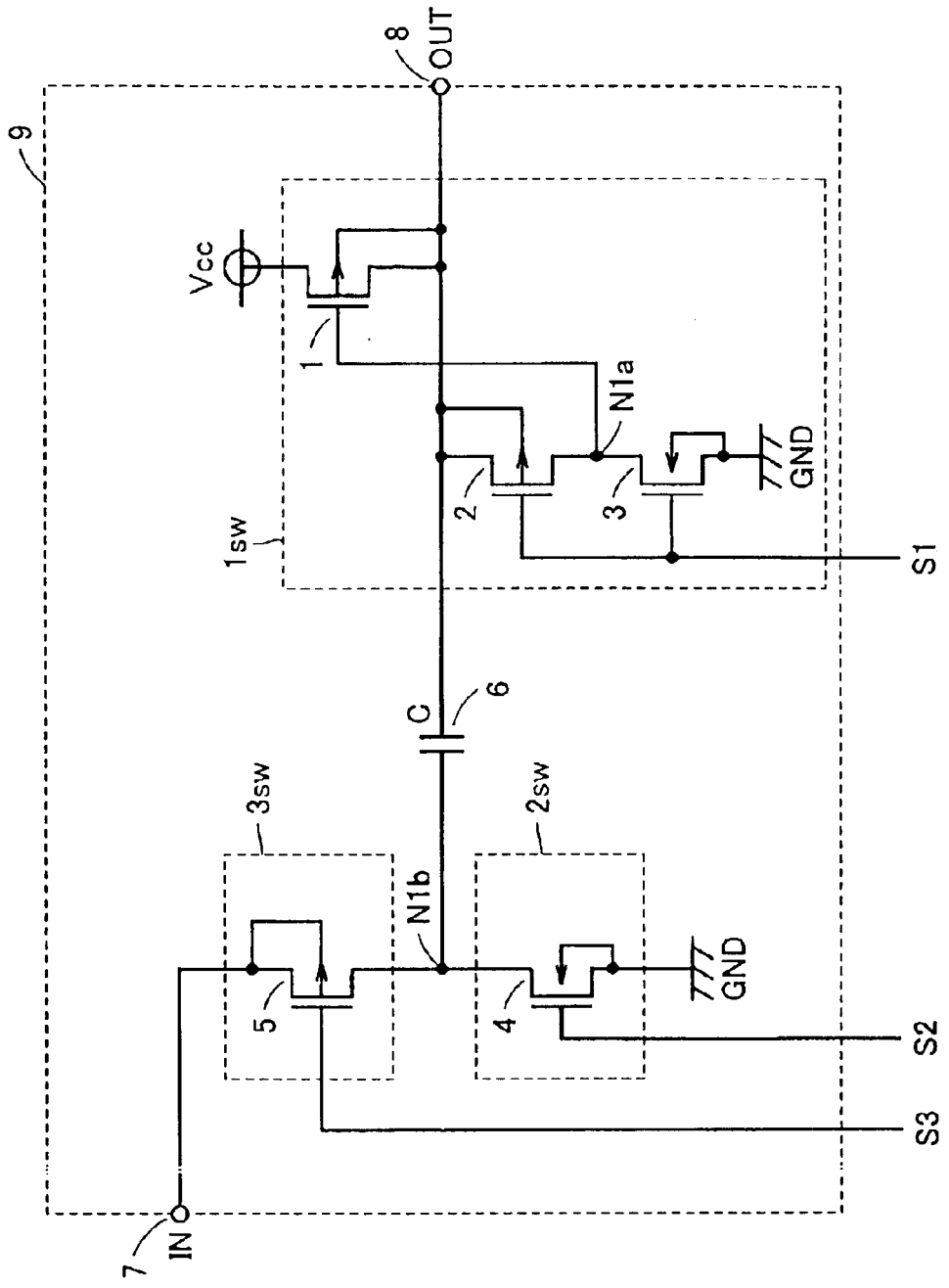
FIG. 4 is a circuit diagram showing an example of a structure of a boosting circuit unit.

Referring to FIG. 4, a boosting circuit unit 9 includes a switch 1sw formed of P channel MOS transistors 1 and 2 and an N channel MOS transistor 3, a switch 2sw formed of an N channel MOS transistor 4, a switch 3sw of a P channel MOS transistor 5, and a capacitive element 6. In the boosted circuit unit of FIG. 4, the circuit element connected closest to an input terminal 7 is P channel MOS transistor 5. It is the source of P channel MOS transistor 5 where the current from input terminal 7 may be congregated most.

P channel MOS transistor 1 is connected between the line of power supply potential Vcc and the line of output terminal 8. P channel MOS transistor 2 and N channel MOS transistor 3 are connected in series between the line of output terminal 8 and the line of ground potential GND. P channel MOS transistor 1 has its gate connected to a node N1a. P channel MOS transistor 2 and N channel MOS transistor 3 have their gates both connected to the line of a clock signal S1. P channel MOS transistors 1 and 2 have their back gates connected to the line of output terminal 8 whereas N channel MOS transistor 3 has its back gate connected to the line of ground potential GND.

P channel MOS transistor 5 and N channel MOS transistor 4 are connected in series between the line of input terminal 7 and the line of ground potential GND. N channel MOS transistor 4 has its gate connected to the line of a clock signal S2 whereas P channel MOS transistor 5 has its gate connected to the line of clock signal S3. N channel MOS transistor 4 has its back gate connected to the line of ground potential GND whereas P channel MOS transistor 5 has its back gate connected to the line of input terminal 7. Capacitive element 6 is connected between output terminal 8 and node N1b via switch 1sw.

The operation of boosting circuit unit 9 will be described hereinafter.

First, the operation of switch 1sw will be described. When clock signal S1 is at an H level, N channel MOS transistor 3 is rendered conductive, and node N1a attains the level of ground potential GND.

Accordingly, the gate of P channel MOS transistor 1 is driven to an L level (logical low), whereby P channel MOS transistor 1 is rendered conductive, and output terminal 8 is electrically connected to power supply potential Vcc. In contrast, when clock signal S1 is at an L level, P channel MOS transistor 2 is rendered conductive, and node N1a attains a potential level identical to that of output terminal 8. Accordingly, the gate of P channel MOS transistor 1 is pulled up to an H level, whereby P channel MOS transistor 1 is rendered non-conductive, and output terminal 8 is electrically cut off from power supply potential Vcc.

Specifically, switch 1sw electrically connects output terminal 8 and power supply potential Vcc when clock signal S1 is at an H level, and electrically cuts off output terminal 8 and power supply potential Vcc when clock signal S1 is at an L level.

Next, the operation of switch 2sw will be described. When clock signal S2 is at an H level, N channel MOS transistor 4 is rendered conductive, and node N1b is electrically connected to ground potential GND. When clock signal S2 is at an L level, N channel MOS transistor 4 is rendered nonconductive, and node N1b is electrically cut off from ground potential GND.

Next, the operation switch 3sw will be described. When clock signal S3 is at an H level, P channel MOS transistor 5 is rendered non-conductive, and input terminal 7 is electrically cut off from node N1b. When clock signal S3 is at an L level, P channel MOS transistor 5 is rendered conductive, and input terminal 7 is electrically connected with node N1b.

Capacitive element 6 is charged/discharged according to the switching of switches 1sw–3sw by clock signals S1–S3. How capacitive element 6 is involved in the boosting operation according to the series connection of boosting circuit unit 9 is as described with reference to FIGS. 2 and 3.

Figure 5:
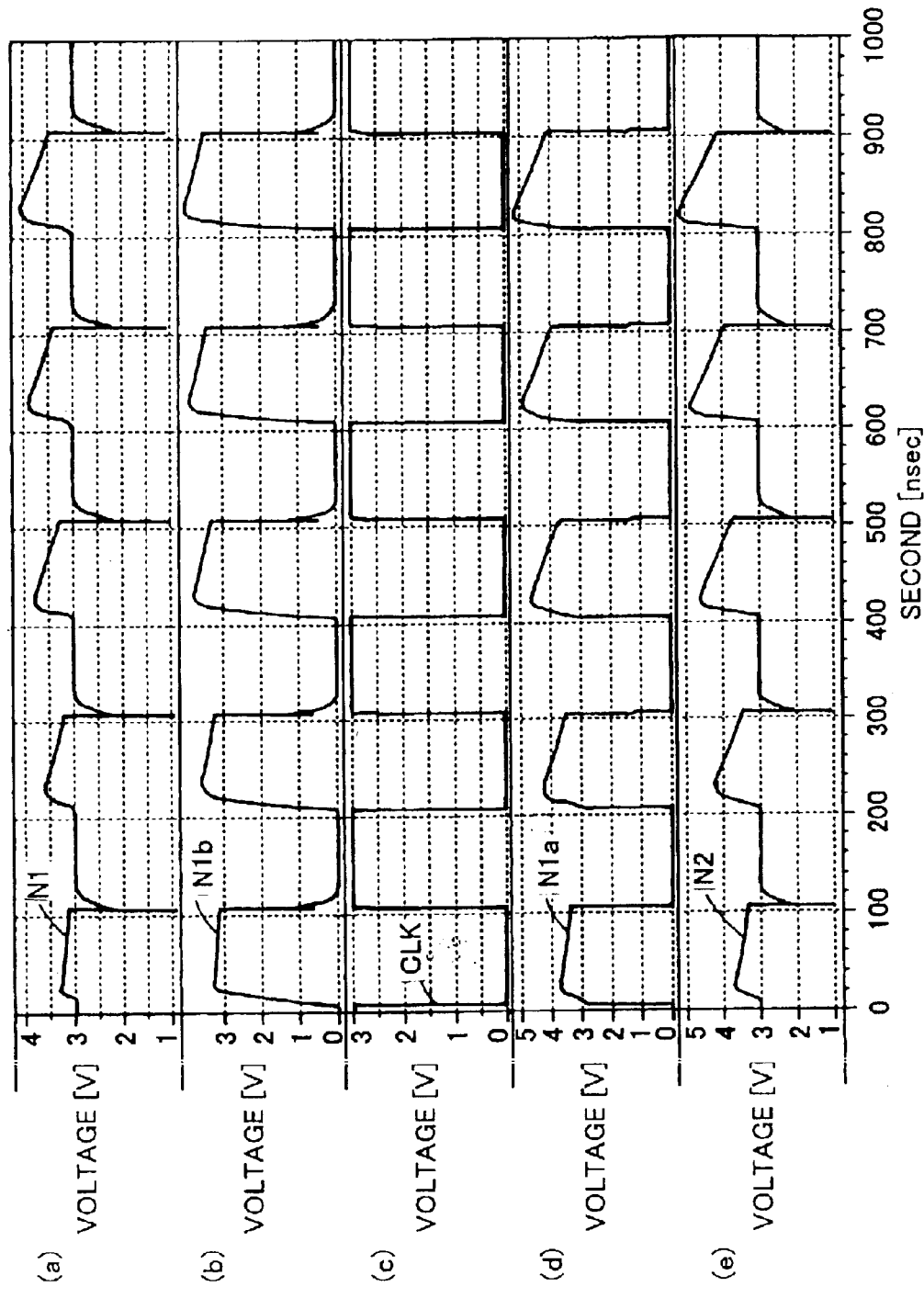
FIG. 5 represents a voltage waveform of each node in a boosting 30 circuit unit 20 of the second stage obtained by simulation in the case where four stages of the boosting circuit unit of FIG. 4 are connected in series as shown in FIG. 1.

FIG. 5 represents a voltage waveform of each node in boosting circuit unit 20 of the second stage in the case where four stages of the boosting circuit units of FIG. 4 are connected in series as shown in FIG. 1, obtained by simulation. As previously stated, clock signal CLK supplied from OSC 21 is a common version of clock signals S1–S3 of FIG. 4.

As shown in FIG. 5, when clock signal CLK of (c) is at an L level, the voltage waveform of node N1 (input terminal 7) of (a) is equal to the voltage waveform of node N1b of (b), and the voltage waveform of node N2 (output terminal 8) of (e) is equal to the voltage waveform of node N1a of (d). In contrast, when clock signal CLK of (c) is at an H level, the voltage waveforms of both node N1 of (a) and node N2 of (e) attain the level of power supply potential Vcc whereas node N1b of (b) and node N1a of (d) both attain the level of ground potential GND. Therefore, the simulation of the voltage waveform at each node shown in FIG. 5 match the operation described with reference to FIG. 4.

Figure 6:
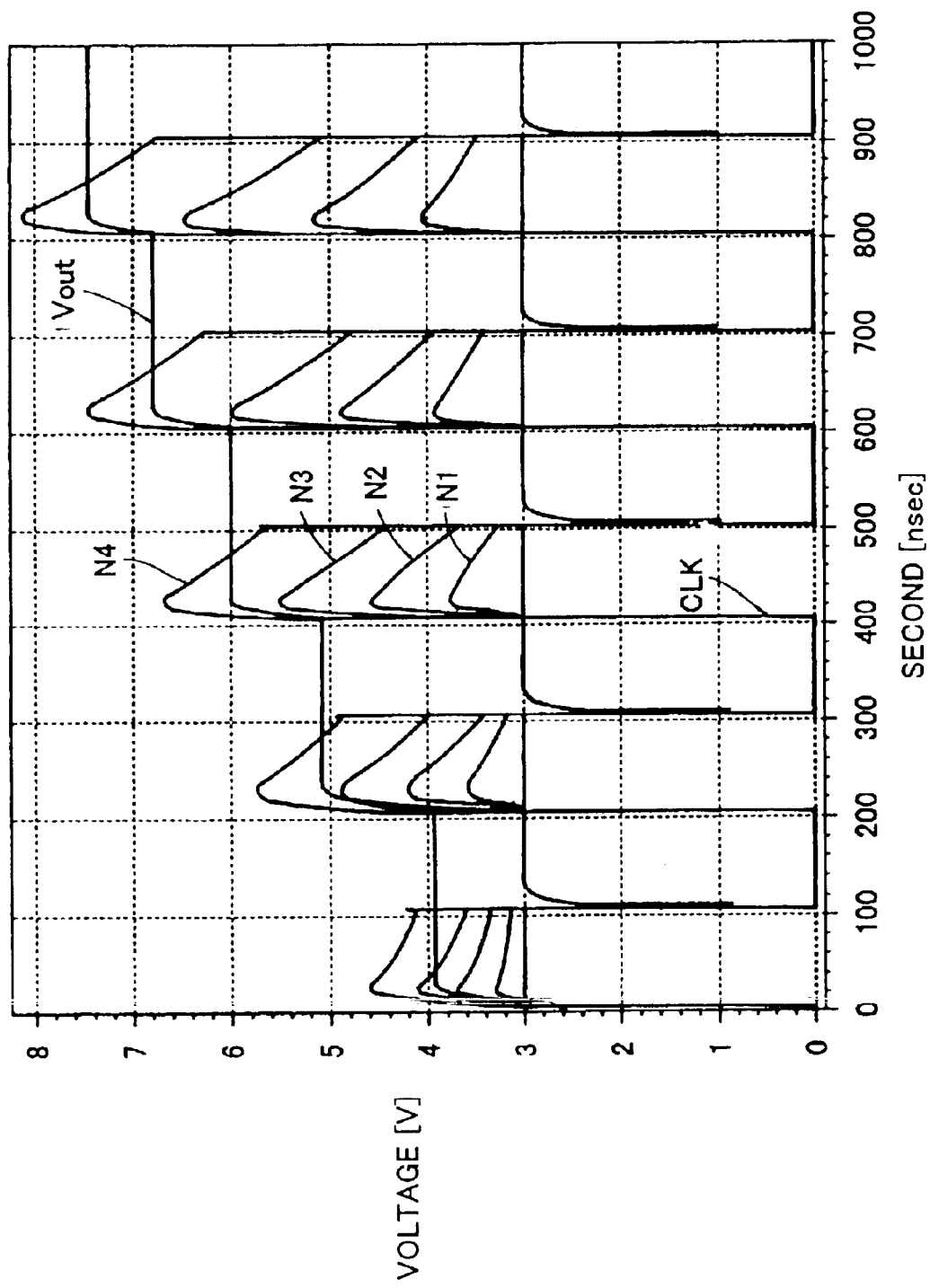
FIG. 6 represents a voltage waveform of each of nodes N1–N4 and a clock signal CLK obtained by simulation in the case where four stages of the boosting circuit unit of FIG. 4 are connected in series as shown in FIG. 1.

FIG. 6 represents the voltage waveform of each of nodes N1–N4 and clock signal CLK in the case where four stages of the boosting circuit unit of FIG. 4 are connected in series as shown in FIG. 1, obtained by simulation. The voltage waveform of clock signal CLK in FIG. 6 has been established assuming that there is an inverter that inverts the output of OSC 21 of FIG. 1. Therefore, the "H" and "L" are the opposite to the operation described with reference to FIG. 4.

As shown in FIG. 6, the voltages at nodes N1–N4 attain the power supply potential Vcc of 3V (setup state) when clock signal CLK is at an L level, and increases over time (pump up state) when clock signal CLK is at an H level. The voltage values of nodes N1–N4 are N1<N2<N3<N4, becoming higher in proportion to the succeeding stage. When clock signal CLK is at an H level, output voltage Vout is boosted by sequentially receiving the charge from capacitive elements 41–44 of respective stages. The potential level of output voltage Vout is maintained by the function of diode 11 when clock signal CLK is at an L level. Therefore, the simulation result of FIG. 6 is consistent with the operation described with reference to FIG. 4 except for the inversion of "H" and "L".

The conventional boosting circuit of FIG. 1 has clock signal CLK input in common to all boosting circuit units 10–40. Therefore, boosting circuit units 10–40 will all be rendered active at the same time.

When capacitive elements 41–44 included in respective boosting circuit units 10–40 attain a series connection state, charge is supplied from the input terminal of the first-stage boosting circuit unit to all capacitive elements 41–44. Therefore, the current from input source Vcc will be congregated at the source of P channel MOS transistor 5 which is the circuit element connected closest to the input terminal of the first-stage boosting circuit unit. Power supply noise is generated by this current congregation from the input power source to a specific circuit element, whereby the boosting efficiency of the boosting circuit is degraded.

Furthermore, excessive current congregation from the input power source to a particular circuit element will cause electromigration, resulting in further degradation of the boosting efficiency of the boosting circuit.

A boosting circuit including the features of the present invention will be described in detail hereinafter.

First Embodiment

Figure 7:
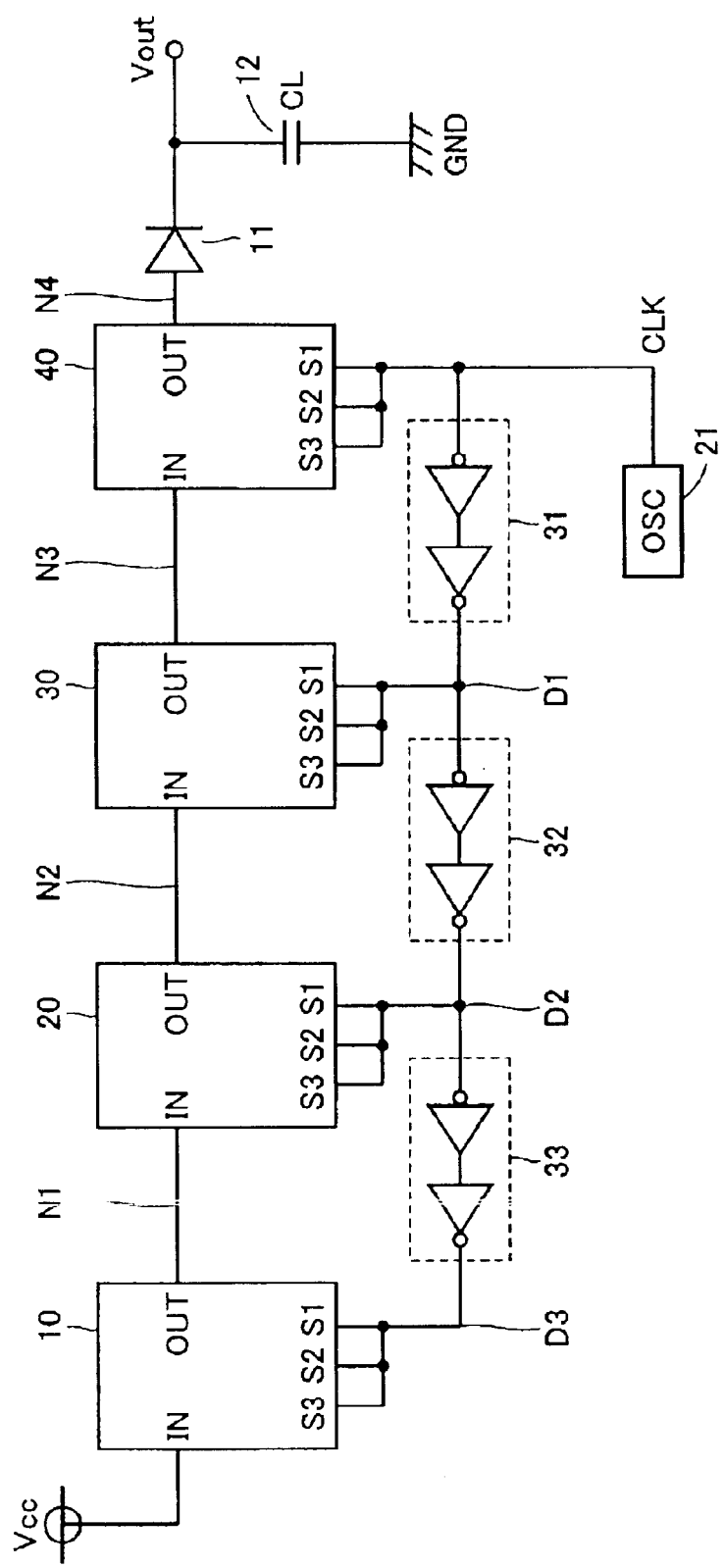
FIG. 7 is a schematic block diagram of a boosting circuit according to a first embodiment of the present invention.

The boosting circuit according to a first embodiment of the present invention shown in FIG. 7 is configured with the addition of delay elements 31–33 connected in series to the boosting circuit of FIG. 1 corresponding to four stages of the boosting circuit unit of FIG. 4 connected in series. The delay element is inserted in the line of clock signal CLK to prevent all the boosting circuit units from being rendered active at the same time by one clock signal CLK.

Figure 8:
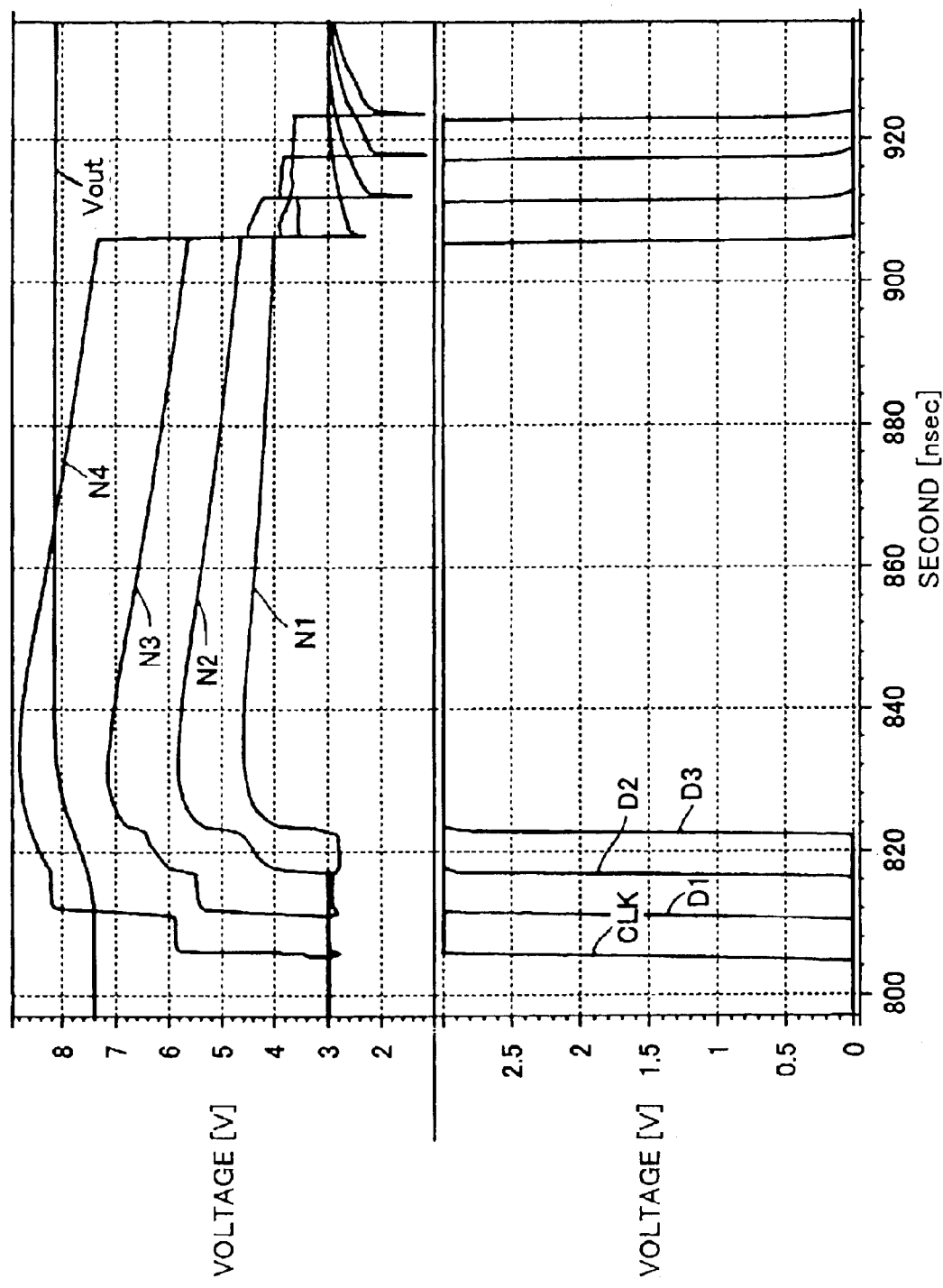
FIG. 8 represents a voltage waveform of each of nodes N1–N4 and D1–D3 and clock signal CLK in the boosting circuit of FIG. 7, obtained by simulation.

FIG. 8 represents the voltage waveform of each of nodes N1–N4 and D1–D3 and clock signal CLK of the boosting circuit of FIG. 7, obtained by simulation. Since the voltage waveform of clock signal CLK in FIG. 8 is established assuming that there is an inverter that inverts the output of OSC 21 of FIG. 7, the "H" and "L" are opposite to the operations described with reference to FIG. 4.

As shown in FIG. 8, when clock signal CLK attains an H level, first the fourth-stage boosting circuit unit 40 is rendered active. The voltage value at node N4 which is the output terminal of boosting circuit unit 40 increases. Since the voltage value at node D1 is still at the level of L by the delay effect of delay element 31, the voltage value of node N3 which is the output terminal of voltage circuit unit 30 is still at the level of power supply potential Vcc. Therefore, it is appreciated from FIGS. 2 and 3 that the current flowing across the fourth stage boosting circuit unit 40 is supplied from the power supply potential Vcc of the third stage, not from the power supply potential Vcc of the first stage.

At an elapse of a predetermined time from clock signal CLK attaining an H level, the voltage of node D1 attains an H level. In response, boosting circuit unit 30 of the third stage is rendered active, whereby the voltage at node N3 which is the output terminal of boosting circuit unit 30 increases.

Thus, by inserting a delay elements in the line of clock signal CLK, there will be difference in the time of clock signal CLK arriving at respective boosting circuit units 10–40. As a result, each boosting circuit unit will be rendered active with time difference. The current flowing across the boosting circuit unit of each stage is supplied from the power supply potential Vcc of the boosting circuit unit of the preceding stage. This prevents current from power supply voltage Vcc of the first stage from being congregated at the source of P channel MOS transistor 5 of boosting circuit unit 10.

Figure 9:
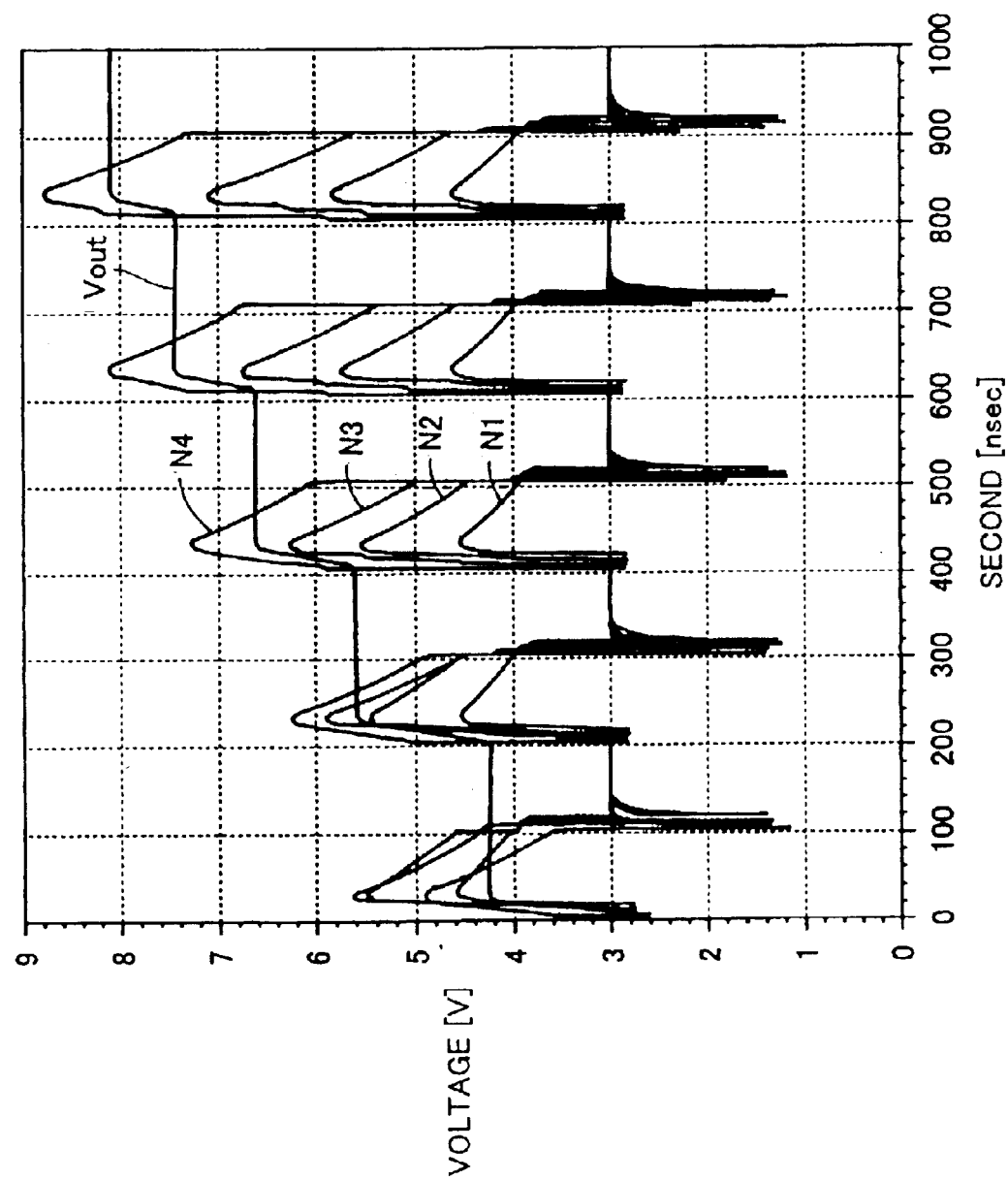
FIG. 9 represents a voltage waveform of each of nodes N1–N4 and an output voltage Vout of the boosting circuit of FIG. 7, obtained by simulation.

FIG. 9 represents a voltage waveform of each of nodes N1–N4 and output voltage Vout at the boosting circuit of FIG. 7, obtained by simulation.

The description related to the voltage waveform of FIG. 9 is similar to that of FIG. 6, with the exception of the absence/presence of a voltage waveform of clock signal CLK, and description thereof will not be repeated. Comparing the voltage waveforms between FIGS. 9 and 6, the boosting circuit of the first embodiment has the boosting circuit unit rendered active one by one to ensure charging/discharging. Therefore, the value of output voltage Vout of FIG. 9 is correspondingly increased.

According to the first embodiment, insertion of delay elements in the line of clock signal CLK prevents the current from power supply voltage Vcc from being congregated at the circuit element connected closest to the input terminal of boosting circuit unit 10. Also, a series connection of delay elements 31–33 allows boosting circuit units 10–40 to be rendered active sequentially to ensure the boosting operation of each boosting circuit unit. Therefore, a boosting circuit of higher boosting efficiency can be achieved.

Instead of connecting delay elements 31–33 in series between respective corresponding boosting circuit units 10–40, a configuration may be implemented in which a delay element is directly connected to each boosting circuit unit to provide delay independently for each boosting circuit unit. By such a configuration, the delay value applied to each boosting circuit unit can be set independent of each boosting circuit unit, without depending upon the delay value of another boosting circuit unit.

Second Embodiment

The boosting circuit of the previous first embodiment had boosting circuit units 10–40 rendered active one by one by inserting delay elements 31–33 in the line of dock signal CLK. However, the cycle of clock signal CLK may differ from that designed due to variation and the like in the fabrication process.

If the cycle of clock signal CLK becomes shorter than the designed cycle, boosting circuit unit 10 will receive the next pulse from OSC 21 before clock signal CLK passes through delay elements 31–33 to render boosting circuit unit 10 of the first stage active. In contrast, if the cycle of clock signal CLK becomes longer than that designed, boosting circuit unit 10 cannot receive the next pulse from OSC 21 even after clock signal CLK passes through delay elements 31–33 to render boosting circuit unit 10 of the first stage active.

In the boosting circuit of the first embodiment, consistency will not be achieved between the delay cycle of delay elements 31–33 and the clock cycle of OSC 21 to cause degradation in the boosting efficiency when the cycle of clock signal CLK differs from that designed due to variation or the like in the fabrication process.

The boosting circuit of the second embodiment is directed to prevent reduction in the boosting efficiency by establishing consistency in the delay cycle of delay elements 31–33 and the clock cycle of OSC 21 even when the cycle of clock signal CLK differs from that designed.

Figure 10:
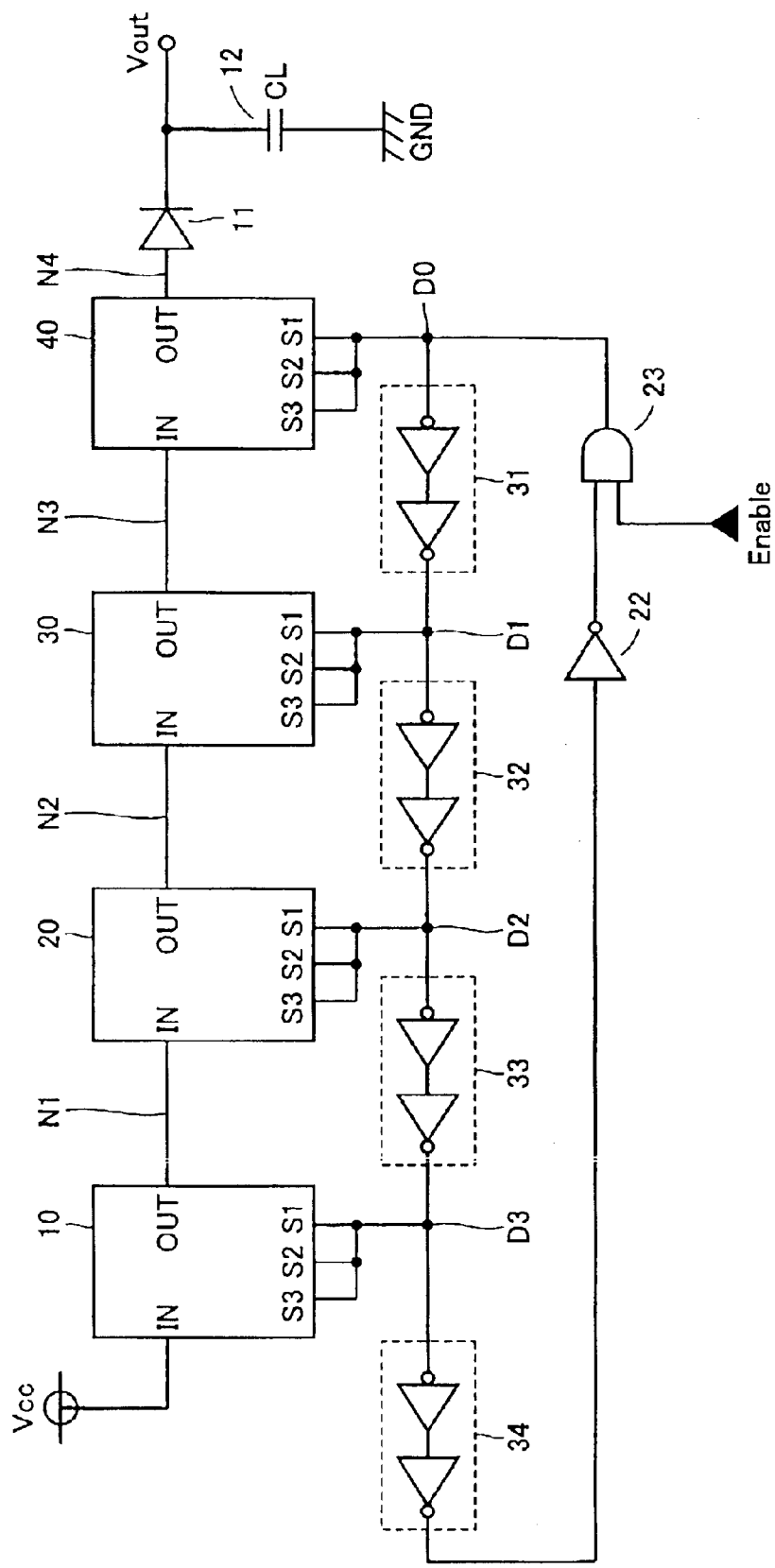
FIG. 10 is a schematic block diagram of a boosting circuit according to a second embodiment of the present invention.

A boosting circuit according to the second embodiment of the present invention shown in FIG. 10 is based on the structure of the boosting circuit of the first embodiment shown in FIG. 7, including an inverter 22, an AND gate 23 and a delay element 34 instead of OSC 21.

By the provision of inverter 22, AND gate 23 and delay element 34 instead of OSC 21, the boosting circuit of the second embodiment realizes a loop oscillation circuit formed of an odd number of stages of inverters and the like. In this loop oscillation, the signal output from delay element 34 passes through inverter 22 and AND gate 23 to return to delay element 31. Therefore, consistency is achieved between the activation timing of each boosting circuit unit and the oscillation cycle in the boosting circuit of the second embodiment. "Enable" at one input terminal of AND gate 23 indicates that this loop oscillator circuit is in an oscillation enable state.

Figure 11:
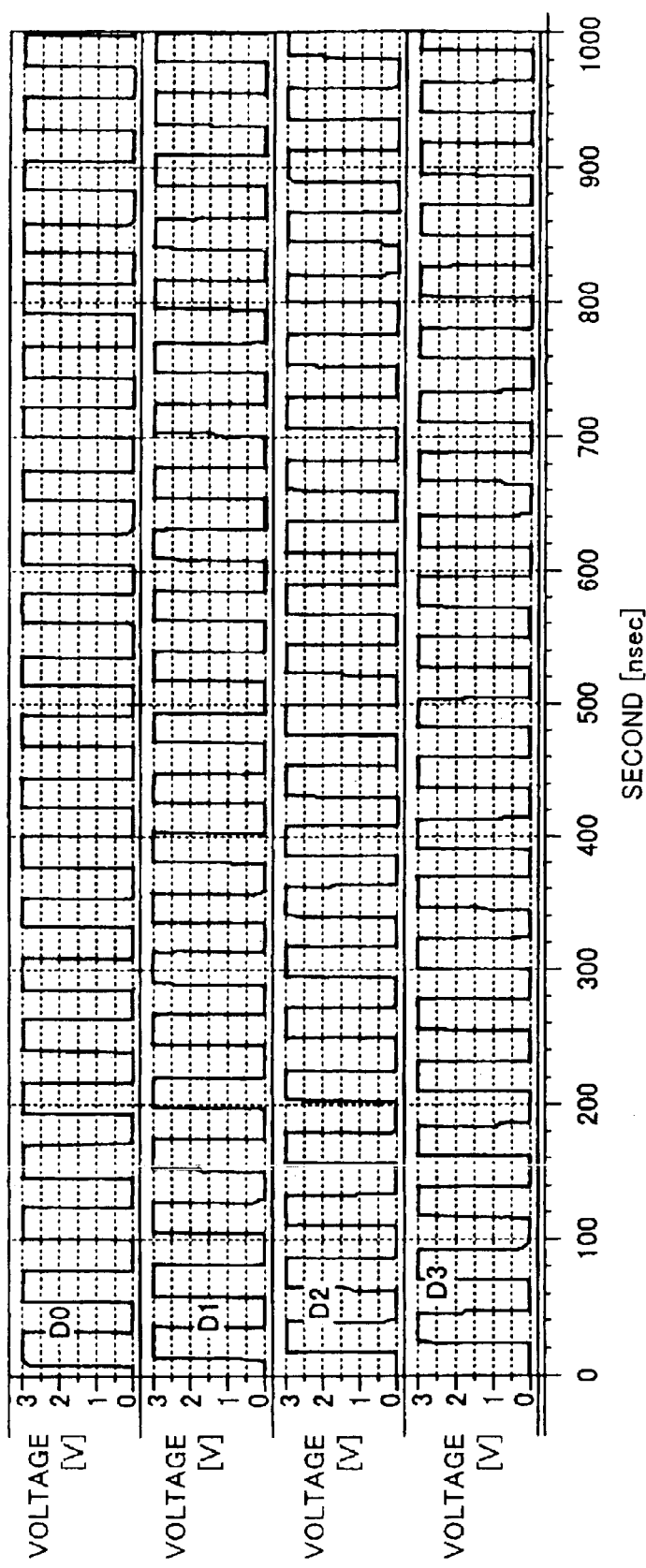
FIG. 11 represents a voltage waveform of each of nodes D0–D3 of the boosting circuit of FIG. 10, obtained by simulation.

FIG. 11 represents a voltage waveform of each of nodes D0–D3 of the boosting circuit of FIG. 10, obtained by simulation.

As shown in FIG. 11, the voltage at node D0 is subjected to a delay by delay element 31, exhibiting a waveform likewise that of node D1. Similarly, the voltages of nodes D1 and D2 are subjected to a delay by delay elements 32 and 33, likewise nodes D2 and D3. It is estimated that the voltage waveform of node D3 overlaps with the voltage waveform of node D0 when the voltage of node D3 is subjected to a delay equal to that described above by delay element 34. This is indicated by the signal output from delay element 34 being returned to delay element 31 through inverter 22 and AND gate 23.

In other words, the simulation result of the voltage waveform of each node in FIG. 11 indicates that the boosting circuit of the second embodiment realizes a loop oscillator circuit formed of an odd number of inverters and the like.

Figure 12:
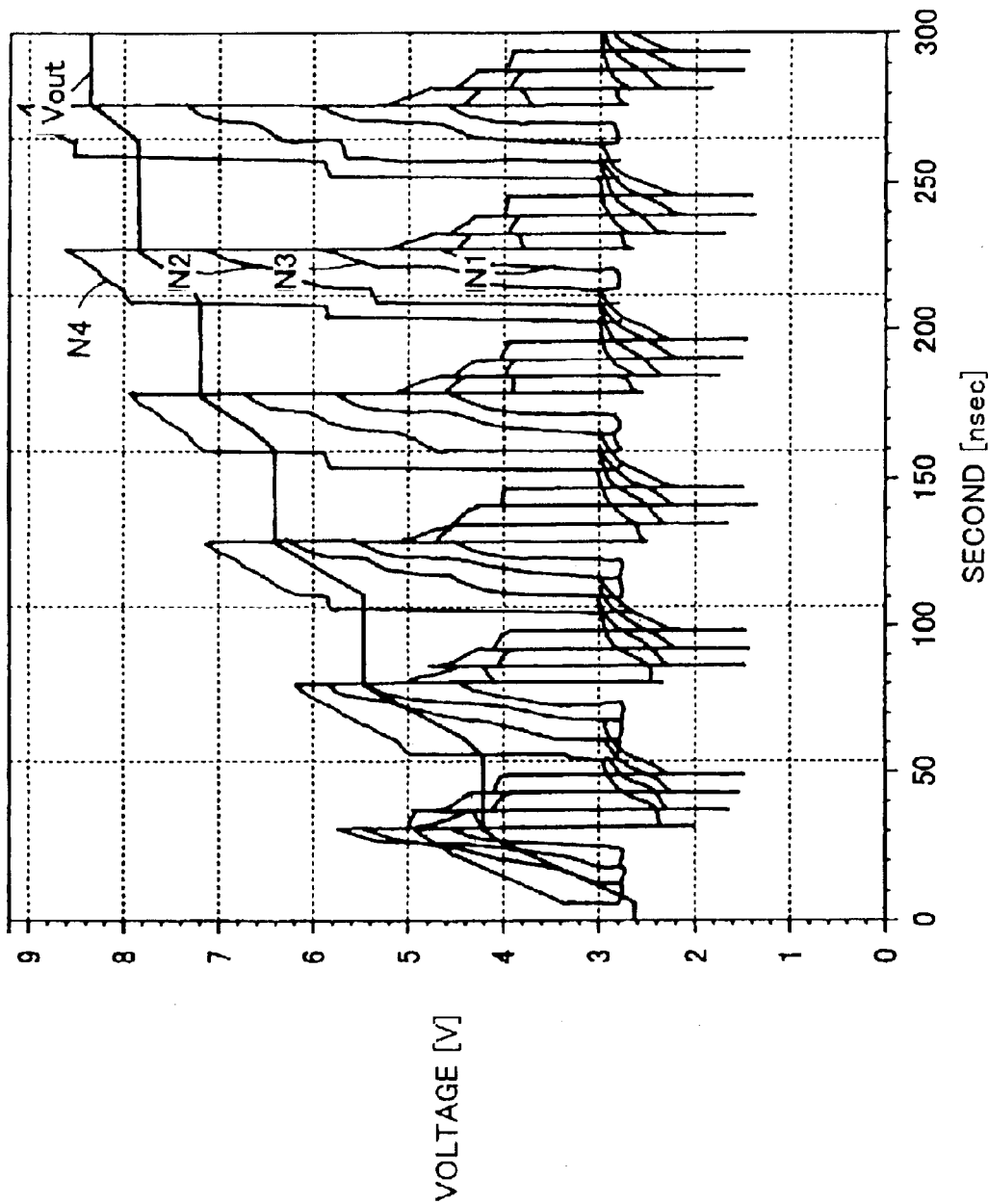
FIG. 12 represents a voltage waveform of each of nodes N1–N4 and an output voltage Vout of the boosting circuit of FIG. 10, obtained by simulation.

FIG. 12 represents the voltage waveform of each of nodes N1–N4 and output voltage Vout of the boosting circuit of FIG. 10, obtained by simulation.

The description related to the voltage waveform of FIG. 12 is similar to that of the previous FIG. 6 with the exception of the presence/absence of a voltage waveform of clock signal CLK, and description thereof will not be repeated. Comparing the waveforms of FIGS. 12 and 9 with the waveform of FIG. 6, the boosting circuit of the second embodiment has consistency achieved between the activation timing of each boosting circuit unit and the oscillation cycle. Therefore, the value of output voltage Vout of FIG. 12 is increased correspondingly.

According to the second embodiment, the provision of inverter 20, AND gate 23 and delay element 34 instead of OSC 21 to form a loop oscillator circuit causes boosting circuit units 10–40 to be rendered active sequentially in a loop manner. A boosting circuit of high boosting efficiency is achieved. By using the delay value of the delay circuit to define the cycle of the clock signal supplied by the clock signal supply circuit, consistency is achieved between the activation timing of each boosting circuit and the oscillation cycle. Thus a boosting circuit of further higher boosting efficiency is achieved.

Third Embodiment

As already described with reference to FIGS. 2 and 3, a boosting circuit having boosting circuit units connected in series supplies charge to capacitive elements 41–44 of respective stages from power supply potential Vcc in each stage in a setup state, and conducts a boosting operation by having capacitive elements 41–44 of each stage connected in series in a pump up state.

In practice, there are parasitic capacitances 51–54 as shown in FIG. 3 in capacitive elements 41–44 of respective stages. Therefore, when capacitive elements 41–44 are connected in series in a pump up state as shown in FIG. 3, capacitive element 41 must transfer charge to capacitive element 12 as well as to parasitic capacitance 51. Then, capacitive element 42 must transfer charge to capacitive element 12 and parasitic capacitance 51 through capacitive element 41, as well as to parasitic capacitance 52.

Capacitive elements 41–44 must supply more charge to the capacitive element of the next stage as a function of distance from the output of the boosting circuit. If the capacitance values of the capacitive elements are all equal, much charge will be consumed by the parasitic capacitance before the charge of the capacitive element, when located distant from the output of the boosting circuit, arrives at the output of the boosting circuit. There may be a case where the charge is completely consumed by the parasitic capacitance. The boosting circuits of the first and second embodiments may not be able to conduct a boosting operation properly due to the degraded boosting efficiency caused by these parasitic capacitances 51–54.

The boosting circuit of the third embodiment is directed to prevent reduction in the boosting efficiency by having the capacitance of capacitive elements 41–44 gradually increased as a function of distance from the output of the boosting circuit. Specifically, the third embodiment of the present invention is based on the structure of the first embodiment of FIG. 7 or the second embodiment of the FIG. 10, having the capacitance values of capacitive elements 41–44 included in respective boosting circuit units set to a smaller to larger value towards boosting circuit unit 40 from boosting circuit unit 10. The structure and operation of the boosting circuit of the third embodiment are similar to those of the first and second embodiments. Therefore, illustration and description thereof will not be repeated.

Examples of specific numeric values of the third embodiment corresponding to a series connection of three stages, i.e., absent of boosting circuit unit 40 of the fourth stage (with parasitic capacitance 54) of FIG. 3, are set forth below. The boosting circuit of the present embodiment requires a plurality of stages of boosting circuit units connected in series. The specific numeric values of the third embodiment are based on a boosting circuit having boosting circuit units of three stages connected in series.

The relationship between the capacitance value Cc of capacitive element 43 included in the third-stage boosting circuit unit 30 and the capacitance value Ccp of parasitic capacitance 53 thereof can be represented as Ccp=αCc, whereas the relationship between the capacitance value Cb of capacitive element 42 included in the second-stage boosting circuit unit 20 and the capacitance value Cbp of parasitic capacitance 52 thereof can be represented as Cbp=βCb. Assuming that α=5.24 [%], β=6.47 [%] and the capacitance value CL=271.55 [pF] of capacitive element 12 which is the load capacitor of the output, the highest boosting efficiency can be achieved when the inclination of the capacitance values of capacitive elements 41–43 are set as Ca=362 [pF], Cb=355 [pF], and Cc=328 [pF].

According to the third embodiment of the present invention, reduction in the boosting efficiency caused by parasitic capacitances 51–54 can be prevented by gradually increasing the capacitance values of capacitive elements 41–44 as a function of distance from the output. Thus, a boosting circuit of further higher boosting efficiency can be achieved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A boosting circuit comprising:

a plurality of boosting circuit units connected in series; and a clock signal supply circuit supplying a clock signal to switch said plurality of boosting circuit units between a setup state and a pump up state, wherein
      said clock signal supply circuit includes a delay circuit to provide a time difference in the time of said clock signal arriving at respective said plurality of boosting circuit units,
      each of said boosting circuit units includes:
         a capacitive element for a boosting operation, the first electrode of which is connected to an input node and the second electrode of which is connected to an output node; and
         a switch, in the setup state, for connecting the output node to a first power supply potential and disconnecting the first electrode of the capacitive element from the input node to connect the first electrode to a second power supply potential, and in the pump up state, for disconnecting the output node from the first power supply potential and connecting the first electrode to the input node.

2. The boosting circuit according to claim 1, wherein said clock signal supply circuit further includes an oscillator circuit oscillating at a predetermined frequency to generate said clock signal, said delay circuit including a plurality of delay circuit units connected in series, said plurality of delay circuit units being arranged between respective said plurality of boosting circuit units correspondingly on a line where said clock signal is supplied from said oscillator circuit to said plurality of boosting circuit units.

3. The boosting circuit according to claim 1, wherein said delay circuit includes an odd number of stages of inverter circuits connected to form a loop oscillator circuit, said clock signal supply circuit supplying an oscillating output of said loop oscillator circuit as said clock signal.

4. The boosting circuit according to claim 3, wherein a cycle of said clock signal supplied by said clock signal supply circuit is defined by a delay value of said delay circuit.

5. The boosting circuit according to claim 1, wherein
   said capacitive element has a capacitive value that increases as a function of distance from an output of said boosting circuit.

* * * * *